US006419732B1

(12) United States Patent
Matsumura et al.

(10) Patent No.: US 6,419,732 B1
(45) Date of Patent: Jul. 16, 2002

(54) PIGMENT INK COMPOSITION

(75) Inventors: Kazuyuki Matsumura; Akira Yamamoto, both of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 146 days.

(21) Appl. No.: 09/635,797

(22) Filed: Aug. 11, 2000

(30) Foreign Application Priority Data

Aug. 13, 1999 (JP) ............................................ 11-229214

(51) Int. Cl.⁷ ............................................... C09D 11/00
(52) U.S. Cl. ................................ 106/31.75; 106/31.86; 106/31.9
(58) Field of Search ........................... 106/31.75, 31.86, 106/31.9

(56) References Cited

U.S. PATENT DOCUMENTS

| | | | | |
|---|---|---|---|---|
| 5,256,191 A | * | 10/1993 | Thompson et al. | ...... 106/31.64 |
| 5,340,386 A | * | 8/1994 | Vincent et al. | ........ 106/31.94 |
| 5,693,127 A | * | 12/1997 | Nigam et al. | ............ 106/31.43 |
| 5,935,311 A | * | 8/1999 | Matsumura et al. | ..... 106/31.43 |
| 6,113,680 A | * | 9/2000 | Aoyama et al. | ......... 106/31.65 |
| 6,197,101 B1 | * | 3/2001 | Matsumura et al. | ... 106/287.11 |
| 6,264,730 B1 | * | 7/2001 | Matsumura et al. | ... 106/287.11 |

FOREIGN PATENT DOCUMENTS

| | | | | |
|---|---|---|---|---|
| EP | 940456 | * | 9/1999 | ........... C09D/11/00 |
| JP | A1161012 | | 3/1999 | |

OTHER PUBLICATIONS

Tsubokawa et al, "Functionalization of Carbon Materials," pp. 322–336 (Aug. 14, 1989).
Tsubokawa et al, vol. 28, No. 4, pp. 286–299 (1990), No Month Available.

* cited by examiner

Primary Examiner—Helene Klemanski
(74) Attorney, Agent, or Firm—Birch, Stewart, Kolasch & Birch, LLP

(57) ABSTRACT

An aqueous pigment ink composition comprising an inorganic pigment and an organosilicon compound obtained by hydrolysis of (A) a hydrolyzable silane containing an amino group-bearing organic group or a partial hydrolyzate thereof and (B) a hydrolyzable silane or a partial hydrolyzate thereof is suited for inkjet recording, has storage stability and nozzle discharge stability, and forms printed images having rub-off resistance and water fastness.

7 Claims, No Drawings

PIGMENT INK COMPOSITION

This invention relates to an aqueous pigment ink composition suitable for use in inkjet recording and more particularly, to an aqueous pigment ink composition which keeps stable dispersion of the pigment and which can be printed on any recording material to form printed images having rub-off resistance and water fastness.

BACKGROUND OF THE INVENTION

Since conventional dye base inks commonly used in the inkjet recording technology undesirably lack light fastness and water fastness, pigment base inks featuring superior water fastness and light fastness are now used in part. Especially as to black ink, carbon black pigment ink has substituted for the dye base ink.

Since aqueous pigment ink uses inorganic pigment particles having good water fastness and light-fastness in themselves as the colorant, images printed on an object therewith are improved in water fastness and light-fastness over the dye base ink. However, since the pigment ink is not dissolved in water as is the dye ink, essentially the pigment ink merely rests on the object to be recorded. Then when the pigment ink is printed on the object to be recorded, typically a sheet of plain paper, the printed image is less resistant to water and removed by rubbing. On use of a marker filled with the pigment ink, images marked therewith are blurred or stained. An attempt would be made to add a binder to the pigment ink to bind pigment particles. Since the aqueous pigment ink is a dispersion of essentially water-insoluble pigment particles in water with the aid of a dispersant or the like, the addition of the binder can cause the particles to flocculate, exacerbating storage stability and often causing the inkjet head to be clogged.

SUMMARY OF THE INVENTION

An object of the invention is to provide a novel and improved pigment ink composition which is suited for use in the aqueous ink recording technology, especially the inkjet recording technology, forms printed images having rub-off resistance and water fastness, and has storage stability.

We have found that a pigment ink composition obtained by formulating in a specific proportion (I) an inorganic pigment, (II) an organosilicon compound (C) obtained by hydrolysis of (A) 100 parts by weight of a hydrolyzable silane containing an amino group-bearing organic group represented by the following general formula (1) or a partial hydrolyzate thereof and (B) 5 to 200 parts by weight of a hydrolyzable silane represented by the following general formula (2) or a partial hydrolyzate thereof, and (III) water is suited for use in the aqueous ink recording technology, especially the inkjet recording technology. When the pigment ink composition is printed on an object to be recorded, the printed images is bound to the object and have rub-off resistance and water fastness. Additionally, the composition remains stable during storage.

$$YR^1{}_mSiR^2{}_{3-m} \tag{1}$$

Herein $R^1$ is a substituted or unsubstituted monovalent hydrocarbon group of 1 to 8 carbon atoms, $R^2$ is an alkoxy or acyloxy group of 1 to 4 carbon atoms, Y is an amino group-bearing organic group, and m is equal to 0 or 1.

$$R^3{}_nSiR^4{}_{4-n} \tag{2}$$

Herein $R^3$ is a substituted or unsubstituted monovalent hydrocarbon group of 1 to 8 carbon atoms, $R^4$ is an alkoxy or acyloxy group of 1 to 4 carbon atoms, and n is equal to 0, 1 or 2.

Accordingly, the invention provides a pigment ink composition comprising (I) 10 parts by weight of the inorganic pigment, (II) 0.001 to 10 parts by weight of the above-mentioned organosilicon compound (C), and (III) 10 to 10,000 parts by weight of water.

DESCRIPTION OF THE PREFERRED EMBODIMENT

Component (I) of the pigment ink composition according to the invention is an inorganic pigment which is typically selected from carbon black, titanium oxide, and iron oxide, but not limited thereto. Of these, carbon black is preferred. These inorganic pigments may be used as such although inorganic pigments are preferably surface modified with an organic substance adsorbing or bonding to the surface, for enhancing the dispersion and stability thereof in a medium. For example, a pigment is treated with an organoalkoxysilane for enhancing the dispersion with the aid of a dispersant as described in JP-A 11-61012. Carbon black particles are surface modified by graft polymerization from polymerization initiator groups that are introduced to particle surfaces on the basis of carboxyl or phenolic hydroxyl groups on particle surfaces as described in Carbon, No. 140, 322 (1989) and Surface, No. 28, 286 (1990).

Component (II) is an organosilicon compound (C) which serves to bind the pigment component in the pigment ink composition to an object to be recorded. This component is effective only in a minor amount and does not adversely affect the storage stability of the pigment ink composition.

The organosilicon compound (C) is obtained by hydrolysis of (A) a hydrolyzable silane containing an amino group-bearing organic group represented by the following general formula (1):

$$YR^1{}_mSiR^2{}_{3-m} \tag{1}$$

wherein $R^1$ is a substituted or unsubstituted monovalent hydrocarbon group of 1 to 8 carbon atoms, $R^2$ is an alkoxy or acyloxy group of 1 to 4 carbon atoms, Y is an amino group-bearing organic group, and m is equal to 0 or 1, or a partial hydrolyzate thereof, and (B) a hydrolyzable silane represented by the following general formula (2):

$$R^3{}_nSiR^4{}_{4-n} \tag{2}$$

wherein $R^3$ is a substituted or unsubstituted monovalent hydrocarbon group of 1 to 8 carbon atoms, $R^4$ is an alkoxy or acyloxy group of 1 to 4 carbon atoms, and n is equal to 0, 1 or 2, or a partial hydrolyzate thereof.

The hydrolyzable silane containing an amino group-bearing organic group represented by formula (1) is a component for rendering the system soluble in water, that is, for endowing the end organosilicon compound (C) with water solubility. The hydrolyzable silanes may be used alone or in admixture of two or more while partial hydrolyzates thereof are also useful.

$$YR^1{}_mSiR^2{}_{3-m} \tag{1}$$

In formula (1), $R^1$ represents substituted or unsubstituted monovalent hydrocarbon groups of 1 to 8 carbon atoms, for example, unsubstituted monovalent hydrocarbon groups such as alkyl, alkenyl, aryl and aralkyl groups, and substituted monovalent hydrocarbon groups in which some or all of the hydrogen atoms on the foregoing groups are replaced by halogen atoms or the like, such as halogenated alkyl groups. Illustrative, non-limiting, examples include —CH$_3$, —CH$_2$CH$_3$, —CH$_2$CH$_2$CH$_3$, —CH(CH$_3$)$_2$, —CH$_2$CH$_2$CH$_2$CH$_3$, —CH(CH$_3$)CH$_2$CH$_3$, —CH$_2$CH(CH$_3$)CH$_3$, —C(CH$_3$)$_3$, —C$_6$H$_5$, and —C$_6$H$_{13}$.

R$^2$ represents alkoxy or acyloxy groups of 1 to 4 carbon atoms. Illustrative, non-limiting, examples include —OCH$_3$, —OCH$_2$CH$_3$, —OCH$_2$CH$_2$CH$_3$, —OCH(CH$_3$)$_2$, —OCH$_2$CH$_2$CH$_2$CH$_3$, —OCH(CH$_3$)CH$_2$CH$_3$, —OCH$_2$CH(CH$_3$)CH$_3$, —OC(CH$_3$)$_3$, —OCOCH$_3$, and —OCOCH$_2$CH$_3$.

Y is an amino group-bearing organic group. For example, it is represented by the following formula (3).

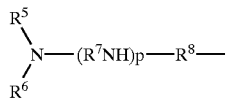
(3)

Herein, R$^5$ and R$^6$ represent hydrogen or monovalent hydrocarbon groups of 1 to 8 carbon atoms, and they may be the same or different. R$^7$ and R$^8$ represent divalent hydrocarbon groups of 1 to 8 carbon atoms, and they may be the same or different. The letter p is 0 or an integer of 1 to 3. It is noted that the monovalent hydrocarbon groups of 1 to 8 carbon atoms are the same as described above for R$^1$; and alkylene groups are exemplary of the divalent hydrocarbon groups of 1 to 8 carbon atoms.

Illustrative, non-limiting, examples of the amino group-bearing organic group represented by Y are given below.

H$_2$NCH$_2$—, H(CH$_3$)NCH$_2$—, H$_2$NCH$_2$CH$_2$—, H(CH$_3$)NCH$_2$CH$_2$—, H$_2$NCH$_2$CH$_2$CH$_2$—, H(CH$_3$)NCH$_2$CH$_2$CH$_2$—, (CH$_3$)$_2$NCH$_2$CH$_2$CH$_2$—, H$_2$NCH$_2$CH$_2$NHCH$_2$—, H(CH$_3$)NCH$_2$CH$_2$NHCH$_2$CH$_2$CH$_2$—, (CH$_3$)$_2$NCH$_2$CH$_2$NHCH$_2$CH$_2$CH$_2$—, H$_2$NCH$_2$CH$_2$NHCH$_2$CH$_2$NHCH$_2$CH$_2$CH$_2$—, H(CH$_3$)NCH$_2$CH$_2$NHCH$_2$CH$_2$NHCH$_2$CH$_2$CH$_2$—.

Of these, H$_2$NCH$_2$CH$_2$CH$_2$—, H$_2$NCH$_2$CH$_2$NHCH$_2$CH$_2$CH$_2$— and H$_2$NCH$_2$CH$_2$NHCH$_2$CH$_2$NHCH$_2$CH$_2$CH$_2$— are preferred.

The letter m is equal to 0 or 1.

Illustrative, non-limiting, examples of the hydrolyzable silane containing an amino group-bearing organic group (A) are given below.

H$_2$NCH$_2$Si(OCH$_3$)$_3$, H$_2$NCH$_2$Si(OCH$_2$CH$_3$)$_3$, H$_2$NCH$_2$SiCH$_3$(OCH$_3$)$_2$, H$_2$NCH$_2$SiCH$_3$(OCH$_2$CH$_3$)$_2$, H$_2$NCH$_2$CH$_2$Si(OCH$_3$)$_3$, H$_2$NCH$_2$CH$_2$Si(OCH$_2$CH$_3$)$_3$, H$_2$NCH$_2$CH$_2$SiCH$_3$(OCH$_3$)$_2$, H$_2$NCH$_2$CH$_2$SiCH$_3$(OCH$_2$CH$_3$)$_2$, H$_2$NCH$_2$CH$_2$CH$_2$Si(OCH$_3$)$_3$, H$_2$NCH$_2$CH$_2$CH$_2$Si(OCH$_2$CH$_3$)$_3$, H$_2$NCH$_2$CH$_2$CH$_2$SiCH$_3$(OCH$_3$)$_2$, H$_2$NCH$_2$CH$_2$CH$_2$SiCH$_3$(OCH$_2$CH$_3$)$_2$, H(CH$_3$)NCH$_2$CH$_2$CH$_2$Si(OCH$_3$)$_3$, H(CH$_3$)NCH$_2$CH$_2$CH$_2$Si(OCH$_2$CH$_3$)$_3$, H(CH$_3$)NCH$_2$CH$_2$CH$_2$SiCH$_3$(OCH$_3$)$_2$, H(CH$_3$)NCH$_2$CH$_2$CH$_2$SiCH$_3$)OCH$_2$CH$_3$)$_2$, H$_2$NCH$_2$CH$_2$NHCH$_2$CH$_2$CH$_2$Si(OCH$_3$)$_3$, H$_2$NCH$_2$CH$_2$NHCH$_2$CH$_2$CH$_2$Si(OCH$_2$CH$_3$)$_3$, H$_2$NCH$_2$CH$_2$NCH$_2$CH$_2$CH$_2$SiCH$_3$(OCH$_3$)$_2$, H$_2$NCH$_2$CH$_2$NHCH$_2$CH$_2$CH$_2$SiCH$_3$(OCH$_2$CH$_3$)$_2$, H(CH$_3$)NCH$_2$CH$_2$NHCH$_2$CH$_2$CH$_2$Si(OCH$_3$)$_3$, H(CH$_3$)NCH$_2$CH$_2$NHCH$_2$CH$_2$CH$_2$Si(OCH$_2$CH$_3$)$_3$, H(CH$_3$)NCH$_2$CH$_2$NHCH$_2$CH$_2$CH$_2$SiCH$_3$(OCH$_3$)$_2$, H(CH$_3$)NCH$_2$CH$_2$NHCH$_2$CH$_2$CH$_2$SiCH$_3$(OCH$_2$CH$_3$)$_2$, H$_2$NCH$_2$CH$_2$NHCH$_2$CH$_2$NHCH$_2$CH$_2$CH$_2$Si(OCH$_3$)$_3$, H$_2$NCH$_2$CH$_2$NHCH$_2$CH$_2$NHCH$_2$CH$_2$CH$_2$Si(OCH$_2$CH$_3$)$_3$, H$_2$NCH$_2$CH$_2$NHCH$_2$CH$_2$NHCH$_2$CH$_2$CH$_2$SiCH$_3$(OCH$_3$)$_2$, H$_2$NCH$_2$CH$_2$NHCH$_2$CH$_2$NHCH$_2$CH$_2$CH$_2$SiCH$_3$(OCH$_2$CH$_3$)$_2$

Of these, the following compounds are especially preferred.

H$_2$NCH$_2$CH$_2$NHCH$_2$CH$_2$CH$_2$Si(OCH$_3$)$_3$, H$_2$NCH$_2$CH$_2$NHCH$_2$CH$_2$CH$_2$Si(OCH$_2$CH$_3$)$_3$

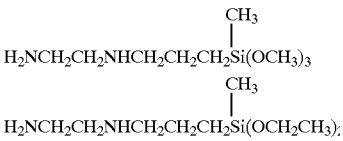

The other hydrolyzable silane (B) to be used in admixture with the hydrolyzable silane containing an amino group-bearing organic group or its partial hydrolyzate (A) is represented by the following general formula (2). The other hydrolyzable silanes may also be used alone or in admixture of two or more while partial hydrolyzates thereof are also useful.

$$R^3{}_n SiR^4{}_{4-n} \quad (2)$$

In formula (2), R$^3$ is a substituted or unsubstituted monovalent hydrocarbon group of 1 to 8 carbon atoms, R$^4$ is an alkoxy or acyloxy group of 1 to 4 carbon atoms, and n is equal to 0, 1 or 2.

The substituted or unsubstituted monovalent hydrocarbon groups of 1 to 8 carbon atoms represented by R$^3$ are the same as described above for R$^1$. Illustrative, non-limiting, examples include —CH$_3$, —CH$_2$CH$_3$, —CH$_2$CH$_2$CH$_3$, —CH(CH$_3$)$_2$, —CH$_2$CH$_2$CH$_2$CH$_3$, —CH(CH$_3$)CH$_2$CH$_3$, —CH$_2$CH(CH$_3$)CH$_3$, —C(CH$_3$)$_3$, —C$_6$H$_5$, and —C$_6$H$_{13}$.

R$^4$ represents alkoxy or acyloxy groups of 1 to 4 carbon atoms. Illustrative, non-limiting, examples include —OCH$_3$, —OCH$_2$CH$_3$, —OCH$_2$CH$_2$CH$_3$, —OCH(CH$_3$)$_2$, —OCH$_2$CH$_2$CH$_2$CH$_3$, —OCH(CH$_3$)CH$_2$CH$_3$, —OCH$_2$CH(CH$_3$)CH$_3$, —OC(CH$_3$)$_3$, —OCOCH$_3$, and —OCOCH$_2$CH$_3$.

Illustrative, non-limiting, examples of the hydrolyzable silane (B) are given below.

Si(OCH$_3$)$_4$, Si(OCH$_2$CH$_3$)$_4$, Si(OCH$_2$CH$_2$CH$_3$)$_4$, Si(OCH$_2$CH$_2$CH$_2$CH$_3$)$_4$, CH$_3$Si(OCH$_3$)$_3$, CH$_3$Si(OCH$_2$CH$_3$)$_3$, CH$_3$Si(OCH$_2$CH$_2$CH$_3$)$_3$, CH$_3$Si(OCH$_2$CH$_2$CH$_2$CH$_3$)$_3$, (CH$_3$)$_2$CHSi(OCH$_3$)$_3$, (CH$_3$)$_2$Si(OCH$_3$)$_2$, (CH$_3$)$_2$Si(OCH$_2$CH$_3$)$_2$, (CH$_3$)$_2$Si(OCCH$_2$CH$_2$CH$_3$)$_2$, (CH$_3$)$_2$Si(OCH$_2$CH$_2$CH$_3$)$_2$, ((CH$_3$)$_2$CH)$_2$Si(OCH$_3$)$_2$,

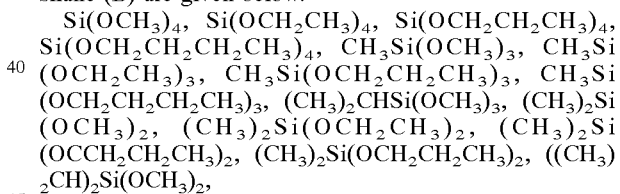
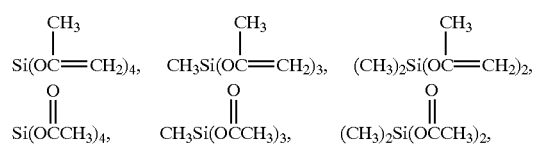

Of these, Si(OCH$_3$)$_4$, Si(OCH$_2$CH$_3$)$_4$, CH$_3$Si(OCH$_3$)$_3$, CH$_3$Si(OCH$_2$CH$_3$)$_3$, (CH$_3$)$_2$Si(OCH$_3$)$_2$ and (CH$_3$)$_2$Si(OCH$_2$CH$_3$)$_2$ and partial hydrolyzates thereof are especially preferred.

Upon hydrolysis, 5 to 200 parts by weight, preferably 10 to 150 parts by weight of the hydrolyzable silane or partial hydrolyzate (B) is mixed with 100 parts by weight of 25 the hydrolyzable silane or partial hydrolyzate (A). More than 200 parts of component (B) on this basis is undesirable because the dispersion stability of the pigment is exacerbated.

In producing the organosilicon compound (C) as component (II), water is mainly used as the solvent. If necessary, an organic solvent soluble in water such as an alcohol, ester, ketone or glycol is used in admixture with water. Such organic solvents include alcohols such as methyl alcohol, ethyl alcohol, 1-propyl alcohol and 2-propyl alcohol, esters such as methyl acetate, ethyl acetate and ethyl acetoacetate, ketones such as acetone and methyl ethyl ketone, and glycols such as glycerin and diethylene glycol.

An appropriate amount of the solvent is about 400 to 5,000 parts by weight and more preferably about 1,000 to 3,000 parts by weight per 100 parts by weight of the starting silanes combined. Less than 400 parts of the 10 solvent may allow hydrolysis reaction to proceed beyond the desired extent, resulting in a non-uniform system or storage instability. More than 5,000 parts of the solvent is uneconomical in some cases.

The amount of water in the solvent is preferably adjusted such that the molar ratio of water to the starting silanes may fall in the range of 5/1 to 50/1. If this molar ratio is less than 5, hydrolysis may not proceed to the completion, sometimes resulting in an unstable liquid. A molar ratio in excess of 50 may invite an economical 20 disadvantage.

Hydrolysis may be effected by any of the following reaction procedures (1) to (4). Procedure (1) is to add dropwise a mixture of silanes (A) and (B) to water or a mixture of an organic solvent and at least a necessary amount of water to effect hydrolysis. Procedure (2) is to add dropwise water to a mixture of silanes (A) and (B) or a mixture of silanes (A) and (B) and an organic solvent. In procedure (3), the hydrolyzable silane or partial hydrolyzate (B) is added dropwise to water or a mixture of 30 an organic solvent and at least a necessary amount of water to effect hydrolysis, followed by dropwise addition of the hydrolyzable silane or partial hydrolyzate (A). In procedure (4), the hydrolyzable silane or partial hydrolyzate (A) is added dropwise to water or a mixture of 35 an organic solvent and at least a necessary amount of water to effect hydrolysis, followed by dropwise addition of the hydrolyzable silane or partial hydrolyzate (B). Of these, reaction procedure (1) is especially preferred from the standpoint of stability of a water-fast ink composition.

It is understood that the organosilicon compound (C) is obtained in the form of an aqueous solution. If necessary, by further adding or removing water, the solution is adjusted to a solution containing 10 to 2,000 parts by weight of water per 100 parts by weight of the organosilicon compound (C).

The thus obtained component (II) remains stable in an aqueous ink composition during storage, and especially does not alter the dispersed state of the pigment (I) therein and keeps the pigment in stable dispersion, and enables to firmly bind the pigment to the object to be recorded.

An appropriate amount of component (II) added, which varies with a particular type of pigment (I), is usually 0.001 to 10 parts, and especially 0.01 to 3 parts by weight of the organosilicon compound (C), which is an active constituent of component (II), per 10 parts by weight of pigment (I). Less than 0.001 part of the organosilicon compound (C) is less effective whereas more than 10 parts achieves no further effect and rather adversely affects the dispersion stability of the liquid ink composition.

Component (III) is water serving as a solvent for the water-fast ink composition. An appropriate amount of water is 10 to 10,000 parts by weight per 10 parts by weight of pigment (I). Less than 10 parts of water adversely affects the storage stability of the water-fast ink composition. An ink composition containing more than 10,000 parts of water is too dilute to form images when printed.

It is advantageous to add a humectant to the pigment ink composition which is used in the inkjet recording method because the humectant is effective for precluding nozzle clogging and enhancing ink discharge stability. Useful humectants are polyhydric alcohols. Glycerin, diethylene glycol, triethylene glycol, low molecular weight polyethylene glycol and polyvinyl alcohols are exemplary though the humectant is not limited thereto. A mixture of two or more of these humectants is also employable.

An appropriate amount of the humectant added is about 1 to 40 parts, and especially about 5 to 30 parts by weight per 10 parts by weight of the pigment (I). Less than 1 part of the humectant is ineffective for improving ink discharge stability. More than 40 parts of the humectant may weaken the binding of the pigment and is uneconomical in some cases.

For imparting any other desirable properties to the water-fast ink composition, other additives are optionally added insofar as the stability and other advantages are not impaired. Such optional additives include dispersants, UV absorbers, anti-foaming agents, and surfactants. Also, microparticulate inorganic oxides or sol thereof, water-soluble polymers or the like may be added for reinforcement purposes.

The pigment ink composition of the invention has satisfactory storage or dispersion stability and discharge stability and forms printed images having rub-off resistance and water fastness.

EXAMPLE

Examples of the invention are given below by way of illustration and not by way of limitation.

Sinthesis Example 1

A 200-ml reactor equipped with a stirrer, thermometer and condenser was charged with 120 g (6.67 mol) of water. With stirring, a mixture of 44.4 g (0.2 mol) of $H_2NCH_2CH_2NHCH_2CH_2CH_2Si(OCH_3)_3$ and 15.2 g (0.1 mol) of $Si(OCH_3)_4$ was added dropwise to the reactor at room temperature over 10 minutes, during which period the internal temperature rose from 25° C. to 56° C. The reactor was heated at 60 to 70° C. with an oil bath and stirring was continued at the temperature for one hour. An ester adapter was attached to the reactor, and the internal temperature was raised to 98° C.

The methanol by-product was removed, leaving 137 g of an organosilicon compound aqueous solution. The solution had a nonvolatile content of 27.3% (105° C./3 hours). The solution was diluted with water so as to give a nonvolatile content of 15.0%.

Synthesis Example 2

A 200-ml reactor equipped with a stirrer, thermometer and condenser was charged with 120 g (6.67 mol) of water. With stirring, a mixture of 33.3 g (0.15 mol) of $H_2NCH_2CH_2NHCH_2CH_2CH_2Si(OCH_3)_3$ and 22.8 g (0.15 mol) of $Si(OCH_3)_4$ was added dropwise to the reactor at room temperature over 10 minutes, during which period the internal temperature rose from 25° C. to 53° C. The reactor was heated at 60 to 70° C. with an oil bath and stirring was continued at the temperature for one hour. An ester adapter was attached to the reactor, and the internal temperature was raised to 98° C. The methanol by-product was removed, leaving 117 g of an organosilicon compound aqueous solution. The solution had a nonvolatile content of 27.5% (105° C./3 hours). The solution was diluted with water so as to give a nonvolatile content of 15.0%.

Synthesis Example 3

A 200-ml reactor equipped with a stirrer, thermometer and condenser was charged with 120 g (6.67 mol) of water. With stirring, a mixture of 55.6 g (0.25 mol) of $H_2NCH_2CH_2NHCH_2CH_2CH_2Si(OCH_3)_3$ and 10.4 g (0.05 mol) of $Si(OCH_2CH_3)_4$ was added dropwise to the reactor at room temperature over 10 minutes, during which period the internal temperature rose from 27° C. to 49° C. The reactor was heated at 60 to 70° C. with an oil bath and stirring was continued at the temperature for one hour. An ester adapter was attached to the reactor, and the internal temperature was raised to 98° C. The methanol and ethanol by-products was removed, leaving 137 g of an organosilicon compound aqueous solution. The solution had a nonvolatile content of 31.1% (105° C./3 hours). The solution was diluted with water so as to give a nonvolatile content of 15.0%.

Synthesis Example 4

A 200-ml reactor equipped with a stirrer, thermometer and condenser was charged with 120 g (6.67 mol) of water. With stirring, a mixture of 66.6 g (0.3 mol) of $H_2NCH_2CH_2NHCH_2CH_2CH_2Si(OCH_3)_3$ and 4.1 g (0.03 mol) of $CH_3Si(OCH_3)_3$ was added dropwise to the reactor at room temperature over 10 minutes, during which period the internal temperature rose from 27° C. to 49° C. The reactor was heated at 60 to 70° C. with an oil bath and stirring was continued at the temperature for one hour. An ester adapter was attached to the reactor, and the internal temperature was raised to 98° C. The methanol by-product was removed, leaving 149 g of an organosilicon compound aqueous solution. The solution had a nonvolatile content of 28.7% (105° C./3 hours). The solution was diluted with water so as to give a nonvolatile content of 15.0%.

Synthesis Example 5

A 1.0-liter reactor equipped with a stirrer, thermometer and condenser was charged with 228 g (1.5 mol) of $Si(OCH_3)_4$ and 47.7 g of methanol which were stirred and mixed. With stirring, 18.0 g of 0.05N hydrochloric acid water was added dropwise. The mixture was stirred at an internal temperature of 10 to 150° C. under ice cooling for one hour and at room temperature for a further 6 hours for ripening. An ester adapter was attached to the reactor, and the internal temperature was raised to 70° C. The methanol by-product was removed, leaving 220 g of an organosilicon compound aqueous solution. The solution had a nonvolatile content of 78.7% (105° C./3 hours). The solution was diluted with water so as to give a nonvolatile content of 15.0%.

Pigment ink used

Aqueous Ink-1: surface carboxylated carbon black ink CAB-O-JET 300 (solids 15.2%) by Cabot Corporation
Aqueous Ink-2: surface sulfonated carbon black ink CAB-O-JET 200 (solids 20.0%) by Cabot Corporation
Aqueous Ink-3: pigment ink BC-23 by Canon K.K.

Example 1

A pigment black ink composition was prepared by mixing the following components (1) to (4).
(1) Aqueous ink-1: 65.8 g
(2) Organosilicon compound of Synthesis Example 1: 0.1 g (as 15% aqueous solution)
(3) Water: 24.1 g
(4) Humectant: glycerin 10.0 g Using this pigment black ink composition and an inkjet printer BJC-600S (Canon K.K.), images were inkjet printed on sheets of plain paper (PB PAPER by Canon K.K.). The printed sheets were examined by the following tests, with the results shown in Table 1.

Water Fastness

Immediately after inkjet printing, water was flowed over the printed sheet, which was observed for pigment flow.
Good: no blur by pigment flow
Fair: blur by pigment flow
Poor: marked blur by pigment flow Rub-off Resistance-1

After inkjet printing, the printed sheet was dried one day at room temperature. The printed image was wiped with wet tissue and it was observed how the pigment was separated.
Good: no separation by wiping
Fair: slight separation by wiping
Poor: separation by wiping Rub-off Resistance-2

After characters were inkjet printed, the printed sheet was dried one day at room temperature. The printed image was rubbed with an aqueous yellow fluorescent pen. It was observed how the pigment was separated and how the pen tip was stained.
Good: black bleed, no pen tip stain
Fair: black bleed, slight pen tip stain
Poor: black bleed, pen tip stained Discharge Stability After printing operation was continued for one hour, it was observed whether the printed image contained skipping due to clogging of the nozzle orifice with the ink.
Good: no skipping in printed image
Fair: some skips in printed image
Poor: many skips in printed image Storage Stability While the printer was operated 30 minutes a day, it was examined how many days consistent printing continued. That is, the time passed until nozzle clogging or printed image skipping developed was determined.

60° C. Storage Stability

The liquid ink composition was kept in an environment at 60° C., while examining any change of the liquid, until the liquid changed its color or gelled. That is, the time during which the liquid remained stable was determined.

Example 2

(1) Aqueous ink-1: 65.8 g
(2) Organosilicon compound of Synthesis Example 1: 0.5 g
(3) Water: 23.7 g
(4) Humectant: glycerin 10.0 g A pigment black ink composition was prepared by mixing the components (1) to (4). It was printed and examined as in Example 1, with the results shown in Table 1.

Example 3

(1) Aqueous ink-1: 65.8 g
(2) Organosilicon compound of Synthesis Example 2: 0.1 g
(3) Water: 24.1 g
(4) Humectant: glycerin 10.0 g A pigment black ink composition was prepared by mixing the components (1) to (4). It was printed and examined as in Example 1, with the results shown in Table 1.

Example 4

(1) Aqueous ink-1: 65.8 g
(2) Organosilicon compound of Synthesis Example 3: 0.1 g
(3) Water: 24.1 g
(4) Humectant: glycerin 10.0 g A pigment black ink composition was prepared by mixing the components (1) to (4). It was printed and examined as in Example 1, with the results shown in Table 1.

Example 5

(1) Aqueous ink-1: 65.8 g
(2) Organosilicon compound of Synthesis Example 4: 0.1 g
(3) Water: 24.1 g
(4) Humectant: glycerin 10.0 g A pigment black ink composition was prepared by mixing the components (1) to (4). It was printed and examined as in Example 1, with the results shown in Table 1.

Example 6

(1) Aqueous ink-2: 50.0 g
(2) Organosilicon compound of Synthesis Example 1: 0.1 g
(3) Water: 39.9 g
(4) Humectant: glycerin 10.0 g A pigment black ink composition was prepared by mixing the components (1) to (4). It was printed and examined as in Example 1, with the results shown in Table 1.

Example 7

(1) Aqueous ink-2: 50.0 g
(2) Organosilicon compound of Synthesis Example 2: 0.1 g
(3) Water: 39.9 g
(4) Humectant: glycerin 10.0 g A pigment black ink composition was prepared by mixing the components (1) to (4). It was printed and examined as in Example 1, with the results shown in Table 1.

Example 8

(1) Aqueous ink-2: 50.0 g
(2) Organosilicon compound of Synthesis Example 3: 0.1 g
(3) Water: 39.9 g
(4) Humectant: glycerin 10.0 g A pigment black ink composition was prepared by mixing the components (1) to (4). It was printed and examined as in Example 1, with the results shown in Table 1.

Example 9

(1) Aqueous ink-2: 50.0 g
(2) Organosilicon compound of Synthesis Example 4: 0.1 g
(3) Water: 39.9 g
(4) Humectant: glycerin 10.0 g A pigment black ink composition was prepared by mixing the components (1) to (4). It was printed and examined as in Example 1, with the results shown in Table 1.

Example 10

(1) Aqueous ink-3: 78.7 g
(2) Organosilicon compound of Synthesis Example 1: 0.1 g
(3) Water: 21.2 g A pigment black ink composition was prepared by mixing the components (1) to (3). It was printed and examined as in Example 1, with the results shown in Table 1.

Example 11

(1) Aqueous ink-3: 78.7 g
(2) Organosilicon compound of Synthesis Example 2: 0.1 g
(3) Water: 21.2 g A pigment black ink composition was prepared by mixing the components (1) to (3). It was printed and examined as in Example 1, with the results shown in Table 1.

Example 12

(1) Aqueous ink-3: 78.7 g
(2) Organosilicon compound of Synthesis Example 3: 0.1 g
(3) Water: 21.2 g A pigment black ink composition was prepared by mixing the components (1) to (3). It was printed and examined as in Example 1, with the results shown in Table 1.

Example 13

(1) Aqueous ink-3: 78.7 g
(2) Organosilicon compound of Synthesis Example 4: 0.1 g
(3) Water: 21.2 g A pigment black ink composition was prepared by mixing the components (1) to (3). It was printed and examined as in Example 1, with the results shown in Table 1.

Comparative Example 1

(1) Aqueous ink-i: 65.8 g
(3) Water: 24.2 g
(4) Humectant: glycerin 10.0 g

A pigment black ink composition was prepared by mixing the components (1), (3) and (4). It was printed and examined as in Example 1, with the results shown in Table 1.

Comparative Example 2

(1) Aqueous ink-2: 50.0 g
(3) Water: 40.0 g
(4) Humectant: glycerin 10.0 g

A pigment black ink composition was prepared by mixing the components (1), (3) and (4). It was printed and examined as in Example 1, with the results shown in Table 1.

Comparative Example 3

(1) Aqueous ink-3: 78.7 g
(3) Water: 21.3 g

A pigment black ink composition was prepared by mixing the components (1) and (3). It was printed and examined as in Example 1, with the results shown in Table 1.

Comparative Example 4

(1) Aqueous ink-i: 65.8 g
(2) Organosilicon compound of Synthesis Example 5: 0.1 g
(3) Water: 24.1 g
(4) Humectant: glycerin 10.0 g A pigment black ink composition was prepared by mixing the components (1) to (4). It was printed and examined as in Example 1, with the results shown in Table 1.

Comparative Example 5

(1) Aqueous ink-2: 50.0 g
(2) Organosilicon compound of Synthesis Example 5: 0.1 g
(3) Water: 39.9 g
(4) Humectant: glycerin 10.0 g A pigment black ink composition was prepared by mixing the components (1) to (4). It was printed and examined as in Example 1, with the results shown in Table 1.

Comparative Example 6

(1) Aqueous ink-3: 78.7 g
(2) Organosilicon compound of Synthesis Example 5: 0.1 g
(3) Water: 21.2 g A pigment black ink composition was prepared by mixing the components (1), (2) and (3). It was printed and examined as in Example 1, with the results shown in Table 1.

TABLE 1

| | Water fastness | Rub-off resistance -1 | Rub-off resistance -2 | Discharge stability | Storage stability | 60° C. stability |
|---|---|---|---|---|---|---|
| E1 | good | good | good | good | 6 months | 12 months |
| E2 | good | good | good | good | 6 months | 12 months |
| E3 | good | good | good | good | 6 months | 12 months |
| E4 | good | good | good | good | 6 months | 12 months |
| E5 | good | good | good | good | 6 months | 12 months |
| E6 | good | good | good | good | 6 months | 12 months |
| E7 | good | good | good | good | 6 months | 12 months |
| E8 | good | good | good | good | 6 months | 12 months |
| E9 | good | good | good | good | 6 months | 12 months |
| E10 | good | good | good | good | 6 months | 12 months |
| E11 | good | good | good | good | 6 months | 12 months |
| E12 | good | good | good | good | 6 months | 12 months |
| E13 | good | good | good | good | 6 months | 12 months |
| CE1 | poor | poor | poor | good | 6 months | 12 months |
| CE2 | poor | poor | poor | good | 6 months | 12 months |
| CE3 | poor | poor | poor | good | 6 months | 12 months |
| CE4 | fair | fair | fair | poor | 7 days | flocculated in 1 day |
| CE5 | fair | fair | fair | poor | 7 days | flocculated in 1 day |
| CE6 | fair | fair | fair | poor | 7 days | flocculated in 3 days |

There has been described a pigment ink composition which has not only rub-off resistance and water fastness, but also storage or dispersion stability and ink discharge stability.

Japanese Patent Application No. 11-229214 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A pigment ink composition comprising (I) 10 parts by weight of an inorganic pigment,
(II) 0.001 to 10 parts by weight of an organosilicon compound (C) obtained by hydrolysis of (A) 100 parts by weight of a hydrolyzable silane containing an amino group-bearing organic group represented by the following general formula (1):

$$YR^1_m SiR^2_{3-m} \qquad (1)$$

wherein $R^1$ is a substituted or unsubstituted monovalent hydrocarbon group of 1 to 8 carbon atoms, $R^2$ is an alkoxy or acyloxy group of 1 to 4 carbon atoms, Y is an amino group-bearing organic group, and m is equal to 0 or 1, or a partial hydrolyzate thereof, and (B) 5 to 200 parts by weight of a hydrolyzable silane represented by the following general formula (2):

$$R^3_n SiR^4_{4-n} \qquad (2)$$

wherein $R^3$ is a substituted or unsubstituted monovalent hydrocarbon group of 1 to 8 carbon atoms, $R^4$ is an alkoxy or acyloxy group of 1 to 4 carbon atoms, and n is equal to 0, 1 or 2, or a partial hydrolyzate thereof, and (III) 10 to 10,000 parts by weight of water.

2. The composition of claim 1 wherein the inorganic pigment (I) is carbon black.

3. The composition of claim 1 wherein the inorganic pigment (I) is carbon black which has been surface modified with an organic compound adsorbing or bonding thereto.

4. The composition of claim 1 wherein the hydrolyzable silane containing an amino group-bearing organic group represented by the formula (1) is selected from the group consisting of $H_2NCH_2CH_2NHCH_2CH_2CH_2Si(OCH_3)_3$, $H_2NCH_2CH_2NHCH_2CH_2CH_2Si(OCH_2CH_3)_3$,

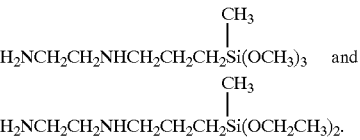

and $$H_2NCH_2CH_2NHCH_2CH_2CH_2Si(OCH_2CH_3)_2 \overset{|}{\underset{CH_3}{}}.$$

5. The composition of claim 1 wherein the hydrolyzable silane of formula (2) is selected from the group consisting of $Si(OCH_3)_4$, $Si(OCH_2CH_3)_4$, $CH_3Si(OCH_3)_3$, $CH_3Si(OCH_2CH_3)_3$, $(CH_3)_2Si(OCH_3)_2$, and $(CH_3)_2Si(OCH_2CH_3)_2$.

6. The composition of claim 1 further comprising 1 to 40 parts by weight of a humectant.

7. The pigment ink composition of any one of claims 1 to 6 which is used in inkjet recording.

* * * * *